(12) United States Patent
Folkins

(10) Patent No.: US 11,141,968 B2
(45) Date of Patent: Oct. 12, 2021

(54) METHOD FOR EJECTOR TO EJECTOR PIXEL HEIGHT NORMALIZATION

(71) Applicant: Xerox Corporation, Norwalk, CT (US)

(72) Inventor: Jeffrey J. Folkins, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 885 days.

(21) Appl. No.: 14/875,959

(22) Filed: Oct. 6, 2015

(65) Prior Publication Data

US 2017/0095975 A1    Apr. 6, 2017

(51) Int. Cl.
  *B29C 64/112* (2017.01)
  *B33Y 50/02* (2015.01)
  *B33Y 30/00* (2015.01)

(52) U.S. Cl.
  CPC ............ *B33Y 50/02* (2014.12); *B29C 64/112* (2017.08); *B33Y 30/00* (2014.12)

(58) Field of Classification Search
  CPC .. B41J 2/16579; B41J 2/16585; B41J 2/2142; B41J 2/2146; B29C 64/112
  See application file for complete search history.

(56) References Cited

U.S. PATENT DOCUMENTS

| | | | | |
|---|---|---|---|---|
| 5,653,925 | A | * | 8/1997 | Batchelder .......... B29C 67/0059 156/62.2 |
| 6,492,651 | B2 | * | 12/2002 | Kerekes .............. B29C 67/0059 250/548 |
| 6,562,269 | B2 | | 5/2003 | Fong |
| 7,598,418 | B2 | | 10/2009 | Mantell et al. |
| 2006/0111807 | A1 | | 5/2006 | Gothait et al. |
| 2013/0201245 | A1 | * | 8/2013 | Donaldson ............. B41J 2/2135 347/19 |

* cited by examiner

*Primary Examiner* — Monica A Huson
*Assistant Examiner* — Kelsey C Grace
(74) *Attorney, Agent, or Firm* — Maginot Moore & Beck LLP

(57) ABSTRACT

A method of calibrating ejectors in an ejector head in a three-dimensional object printer normalizes the masses of the drops ejected by the ejectors. The method operates the plurality of ejectors to eject drops of material to form a plurality of pixels corresponding to a test pattern on the surface. Each ejector in the plurality of ejectors is operated to form a group of adjacent pixels in the test pattern. Each group of adjacent pixels is at least n pixels wide in a cross-process direction for the printer. The method operates a sensor to measure heights of pixels for each group of adjacent pixels in the test pattern. The method adjusts an operation of the plurality of ejectors to normalize heights of layers of material formed by the plurality of ejectors based on the measured heights for the groups of adjacent pixels.

17 Claims, 6 Drawing Sheets

METHOD FOR EJECTOR TO EJECTOR PIXEL HEIGHT NORMALIZATION

TECHNICAL FIELD

The device and method disclosed in this document relates to three-dimensional object printers and, more particularly, to ejector to ejector pixel height normalization in these printers.

BACKGROUND

Digital three-dimensional object manufacturing, also known as digital additive manufacturing, is a process of making a three-dimensional solid object of virtually any shape from a digital model. Three-dimensional object printing is an additive process in which one or more ejector heads eject successive layers of material on a substrate in different shapes. The substrate is supported either on a platform that can be moved three dimensionally by operation of actuators operatively connected to the platform, or the ejector heads are operatively connected to one or more actuators for controlled movement of the ejector heads to produce the layers that form the object. Three-dimensional object printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional object printer is inconsistent drop mass or drop volume between the ejectors in the ejector heads that eject the drops of material that form the objects. If the ejectors of the ejector heads do not produce drops of material of consistent drop mass, each layer of material is not uniform in height. Consequently, print jobs requiring many hours or multiple days may result in printed objects that are deformed and do not conform to specifications. Such objects generally must be scrapped and the print job must be repeated.

What is needed is a method for normalizing drop mass between ejectors of an ejector head. Such a method would enable the consistent production of properly formed objects.

SUMMARY

A method of calibrating ejectors in an ejector head of a three-dimensional object printer, the ejector head having a plurality of ejectors configured to eject drops of material towards a surface. The method includes operating the plurality of ejectors to eject drops of material to form a plurality of pixels corresponding to a test pattern on the surface, each ejector in the plurality of ejectors being operated to form a group of adjacent pixels in the test pattern, each group of adjacent pixels being at least n pixels wide in a cross-process direction for the printer; operating a sensor to measure heights of pixels for each group of adjacent pixels in the test pattern; and adjusting an operation of the plurality of ejectors to normalize heights of layers of material formed by the plurality of ejectors based on the measured heights for the groups of adjacent pixels.

A three-dimensional object printer configured for normalizing the drop mass ejected by the ejectors in an ejector head in the printer includes a surface; an ejector head having a plurality of ejectors configured to eject drops of material onto the surface; a sensor configured to measure heights of drops of material ejected onto the surface; and a controller operatively connected to the ejector head. The controller is configured to operate the plurality of ejectors to eject drops of material to form a plurality of pixels corresponding to a test pattern on the surface, each ejector in the plurality of ejectors being operated to form a group of adjacent pixels in the test pattern, each group of adjacent pixels being at least n pixels wide in a cross-process direction for the printer; operate the sensor to measure heights of pixels for each group of adjacent pixels in the test pattern; and adjust an operation of the plurality of ejectors to normalize heights of layers of material formed by the plurality of ejectors based on the measured heights for the groups of adjacent pixels.

BRIEF DESCRIPTION OF THE DRAWINGS

The foregoing aspects and other features of the method and device are explained in the following description, taken in connection with the accompanying drawings.

DETAILED DESCRIPTION

Figure 1:
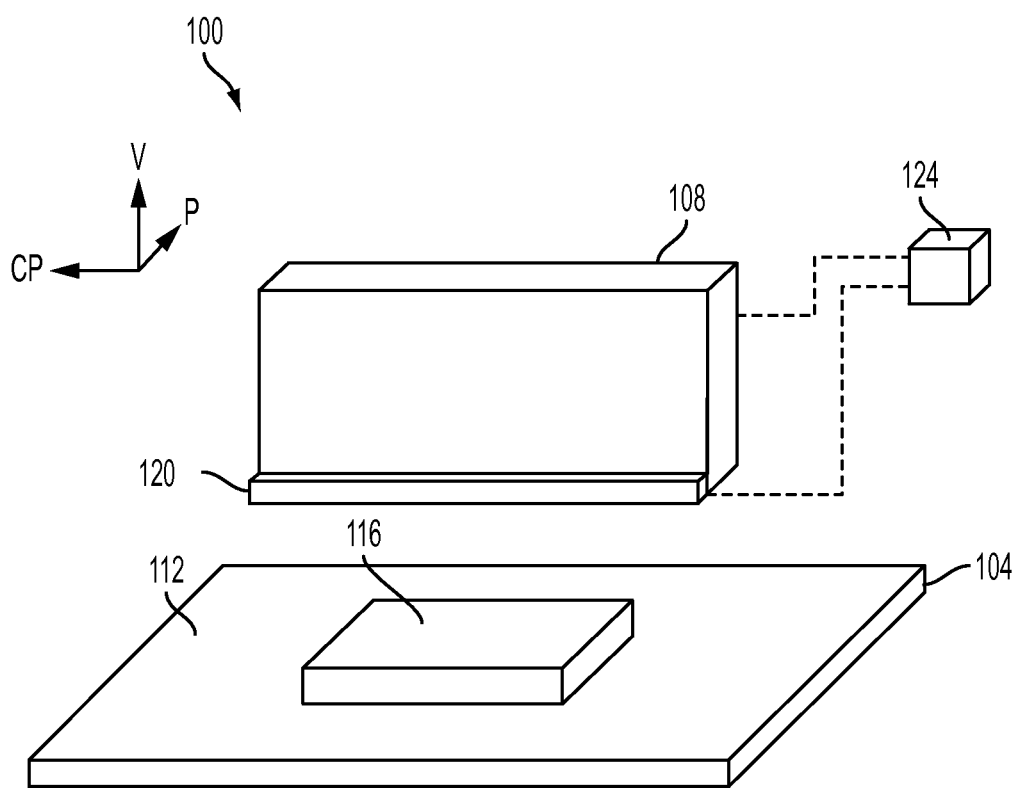
FIG. 1 shows a three-dimensional object printer.

For a general understanding of the environment for the method and printer disclosed herein as well as the details for the method and printer, reference is made to the drawings. In the drawings, like reference numerals designate like elements.

FIG. 1 shows a three-dimensional object printer 100. The printer 100 comprises a platen 104 and an ejector head 108. The ejector head 108 has a plurality of ejectors configured to eject drops of a build material onto a surface 112 of the platen 104 to form a three-dimensional object, such as the part 116. In some embodiments, the ejector head 108 has a first plurality of ejectors configured to eject drops of a build material and a second plurality of ejectors configured to eject drops of a support material, such as wax. The ejector head 108 is configured to move relative to the platen 104 in the process direction P, the cross-process direction CP, and the vertical direction V. In some embodiments, the printer 100 includes actuators configured to move one or both of the ejector head 108 and the platen 104 with respect to one another. The printer 100 further includes a sensor 120 configured to sense heights of layers of material formed by the printer 100. In one embodiment, the sensor 120 is an optical sensor configured to move with respect to the platen 104 in the process direction P to scan an entire layer, one line or row at a time. However, other configurations are possible. Additionally, as shown, the sensor 120 is attached to the ejector head 108. However, the sensor 120 can be configured for movement independent of the ejector and is not attached to the ejector head 108 in such a configuration.

The printer 100 includes a controller 124 operatively connected to at least the ejector head 108. The controller 124 is configured to operate the ejector head 108 with reference to image data to form a three-dimensional object on the platen 112 that corresponds to the image data. To form each layer of the three-dimensional object, the controller 124 operates the printer 100 to sweep the ejector head 108 one or more times in the process direction P, while ejecting drops of material onto the platen 104. Between each sweep, the ejector head 108 shifts in the cross-process direction CP. After each layer is formed, the ejector head 108 moves away from the platen 104 in the vertical direction V to begin printing the next layer.

The controller 124 is also operatively connected to the sensor 120 and configured to operate the sensor 120 so the sensor 120 generates measurements of heights of layers of material formed by the printer 100 and sends those measurements to the controller 124.

Figure 2:
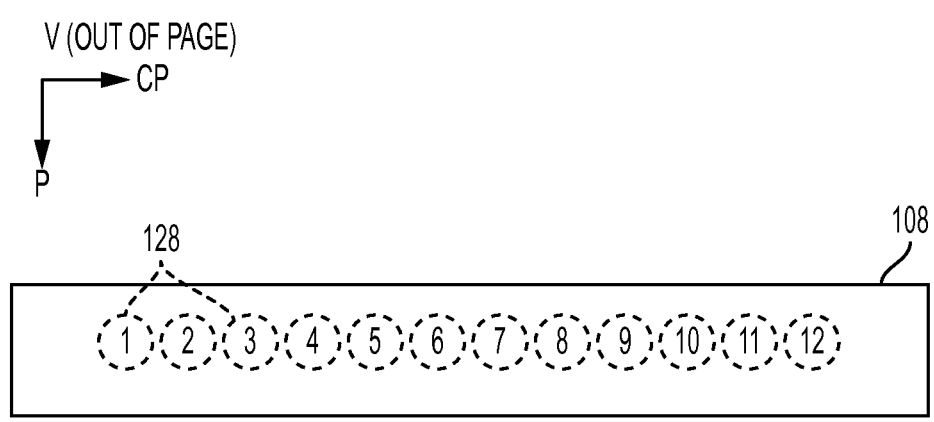
FIG. 2 shows an arrangement of ejectors in the ejector head of the printer shown in FIG. 1.

FIG. 2 shows a top view of the ejector head 108. Ejectors are arranged on a bottom surface of the ejector head 108, which faces the platen 104. Locations 128 of twelve ejectors are shown by dashed circles, which are each labeled with a number 1-12. As shown, the ejectors 1-12 are linearly arranged in a single row in the cross-process direction CP. In practice, the ejector head 108 may have many more ejectors than are shown and need not be arranged in a single row.

The printer 100 can be operated as a single pass or a multi-pass system. In single pass embodiments, the ejector head 108 forms an entire layer in a single pass in the process direction P. Particularly, the controller 124 operates the ejector head 108 to sweep once in the process direction P to form each layer, while each of the ejectors 1-12 eject a series of drops of material to form a plurality of lines of material in the process direction P. The lines of material are directly adjacent to one another and form a layer of material with cross-process resolution equal to the resolution of the ejectors. Particularly, an ejector head 108 having the ejectors 1-12 would produce a layer of material having a cross-process resolution equal to 12 drops of adjacent material.

In multi-pass embodiments, the ejector head 108 forms an entire layer with multiple passes in the process direction P. Particularly, the controller 124 operates the ejector head 108 to sweep multiple times in the process direction with shifts in the cross-process direction P between each sweep. During each sweep, the ejectors 1-12 form lines of material in the process direction P that are not directly adjacent to one another. After each sweep, the ejector head 108 shifts in the cross-process direction CP by a distance and proceeds to form additional lines of material as the ejector head moves in the process direction P or its reciprocal. After a predetermined number of passes, a layer of material is formed having cross-process resolution equal to the resolution of the ejectors times the number of passes. For example, if the printer 100 operates with two passes, then an ejector head 108 having the ejectors 1-12 would produce a layer of material having a cross-process resolution equal to 24 drops of material.

As discussed above, the ejectors 1-12 may produce drops having an inconsistent mass or volume. If the ejectors 1-12 of the ejector heads do not produce drops of material having a consistent mass, each layer of material is not uniform in height. One method of achieving uniform printed material layer heights, i.e., normalizing the height of the layers, is to print a test pattern, measure the height of the drops of material that are formed from each ejector in the test pattern, and perform an actuation to compensate for any differences in the measured heights.

One technique that can be used to improve the signal to noise accuracy of an ejector drop mass measurement is to print a single line with each ejector. Unfortunately, the sensor 120 likely cannot accurately distinguish between neighboring lines formed by different ejectors because the material is likely to flow to the side during printing and cross mix between lines. However, single lines without neighboring support structure on both sides are not stable, i.e., the lines might fall over. Additionally, in order to provide accurate height measurement, the lines must also be printed with multiple layers. Accordingly, an effective test pattern must include groups of adjacent lines formed by common ejectors and each group of adjacent lines must be formed with multiple layers of drops. Particularly, each ejector must form a group of pixels having 'm' pixels in the process direction P and 'n' pixels in the cross-process direction CP. The necessary values of 'm' and 'n' vary with the material being ejected and other process parameters. An image height measurement made in the center of each of these multiple lines can then be assured to be an accurate measurement of the relative ejector drop masses.

In order to form a test pattern having groups of pixels formed by a common ejector and having a cross-process width of 'n', the test pattern must necessarily be formed using 'n' multiple passes. If the printer 100 is inherently operated with at least 'n' passes, then the groups of pixels are easily formed with the necessary width 'n.' However, single pass printers or multi-pass printers operated with fewer than 'n' passes cannot easily print such a test pattern. For example, a printer that prints a 600 dpi image in two passes with 300 dpi ejector heads cannot easily print a test pattern requiring pixel groups having a width of 'n'=4.

Figure 3:
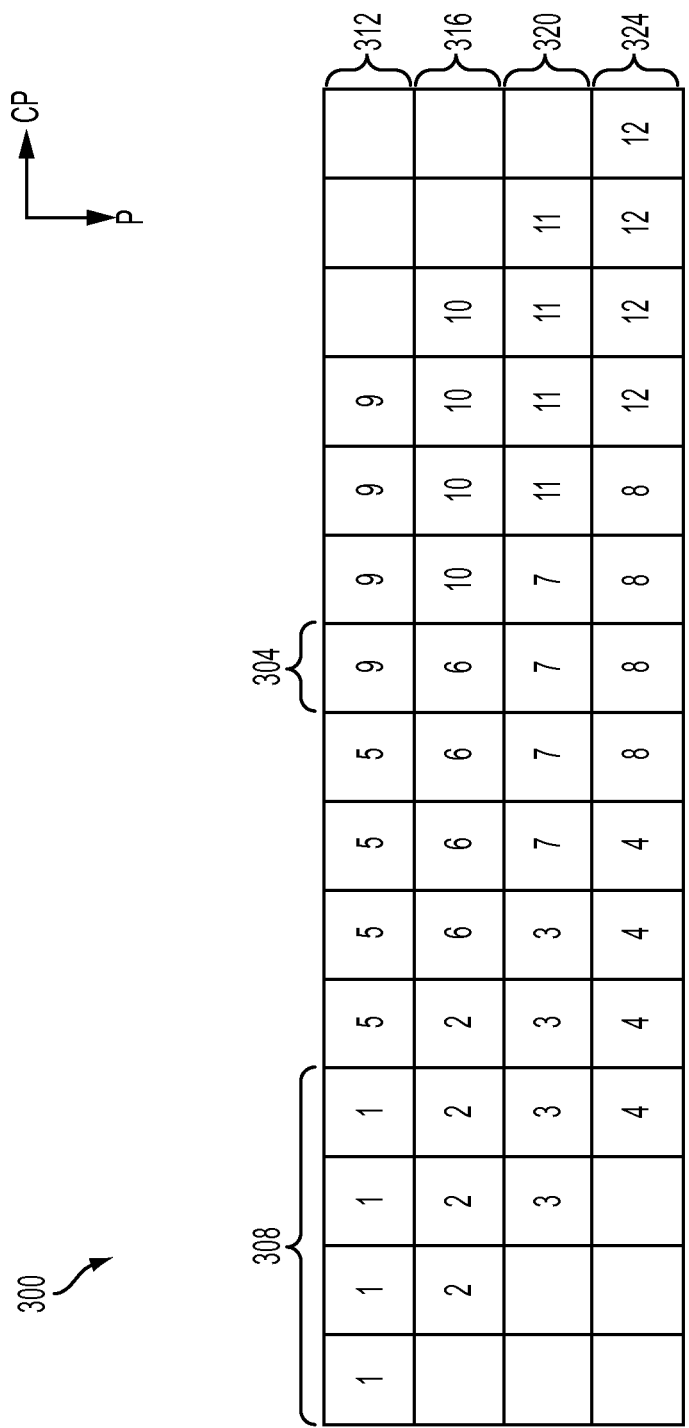
FIG. 3 shows a basic test pattern formed by the ejectors shown in FIG. 2.
Figure 4:
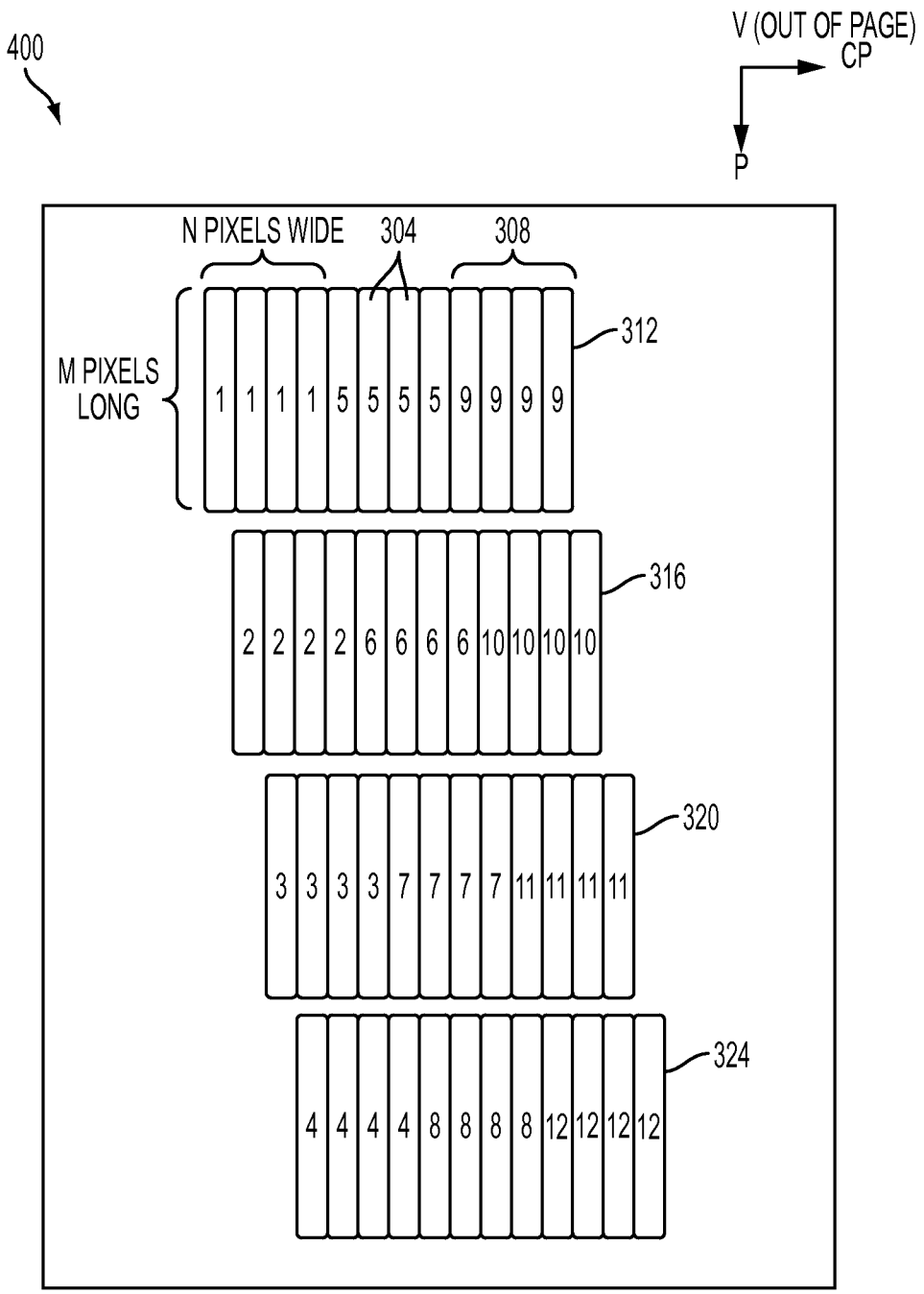
FIG. 4 shows a layer of material having test pattern of FIG. 3.

FIG. 3 shows a schematic for a test pattern 300 and FIG. 4 shows a layer of material 400 in which the test pattern 300 has been formed. The test pattern 300 comprises blocks 312, 316, 320, and 324, each having a plurality of adjacent lines 304. Each line 304 corresponds to a line of 'm' pixels printed in the process direction P. In some embodiments, each of the lines 304 is printed with multiple layers of material. Each line 304 is labeled with a number corresponding to an ejector of the ejector head 108. The number that labels each of the lines 304 indicates which of the ejectors of the ejector head 108 is assigned to form each of the lines 304. As shown, only 12 unique ejectors are represented in the test pattern 300. However, in practice, a test pattern may include many more ejectors. Each of the blocks 312, 316, 320, and 324 are formed at different positions in the process direction P and may or may not be contiguous with one another.

The test pattern 300 comprises several groups of pixels 308. Each group 308 includes 'n' directly adjacent lines 304 formed by a common ejector. In other words, each group of pixels 308 comprises an 'm'×'n' array of pixels. As shown, each group of pixels 308 includes four directly adjacent lines 304 in a common block, i.e., 'n'=4. However, different amounts of pixels in different adjacent arrangements are possible. Each of the ejectors 1-12 of the ejector head 108 is used to form at least one of the groups of pixels 308. As shown, ejectors 1, 5, and 9 form groups of pixels 308 in the first block 312, ejectors 2, 6, and 10 form groups of pixels 308 in the second block 316, ejectors 3, 7, and 11 form groups of pixels 308 in the third block 320, and ejectors 4, 8, and 12 form groups of pixels 308 in the fourth block 324. However, different arrangements of groups and blocks are possible, depending upon the arrangement and quantity of ejectors in the ejector head 108.

As described above the subsets of ejectors that form each of the blocks 312, 316, 320, and 324 are staggered and do not comprise sequentially ordered ejectors. This staggering provides certain efficiencies during formation of the test pattern 300. For example, if the first block 312 included groups of pixels 308 formed by ejectors 1-3, the ejector head 108 would have to print each of the lines 304 individually with a separate pass of the ejector head 108. Separate passes are required because each of the lines 304 would require a different cross-process position of the ejector head 108. However, if the first block 312 comprises groups of pixels formed by ejectors 1, 5, and 9 (i.e., the subset of ejectors staggered by four ejector locations 128), then multiple lines 304 can be printed which each pass and the entire block 312 can be formed with only 'n' passes of the ejector head 108. More particularly, to achieve this efficiency, the subsets of ejectors used to form each of the blocks 312, 316, 320, and 324 are staggered by 'n' ejector locations 128.

Additionally, in the embodiment shown, each of the blocks 312, 316, 320, and 324 are shifted by one position in the cross-process direction CP with respect to adjacent blocks. More particularly, each of the blocks 312, 316, 320, and 324 begins a cross-process position corresponding to the lowest numbered ejector in the subset of ejectors that forms the respective block. This shifted pattern further minimizes a number of movements of the ejector head 108 because, while each row is formed, the ejectors begin in a home position. For example, while forming the second block 316, the ejectors 2, 6, and 10 begin by ejecting drops at the $2^{nd}$, $6^{th}$, and $10^{th}$ positions in the cross-process direction CP.

If an 'n' wide group of pixels is printed with each ejector, the support for the cross direction edges needs to be considered. No support, i.e., air, could be the support at these edges, however, this support would be less efficient than simply starting another group of pixels with a different ejector to provide material support. Also, if the edge transition is to air and not supported, the material would likely droop and require a significantly large 'n' value for groups of pixels on the edge to provide a reliable height at the center of the image. Hence printing test images with contiguous transitions from each chosen ejector's 'n' passes to another ejector's 'n' passes is the most efficient method. Particularly, the controller 124 is configured to operate the ejector head 108 to eject additional drops of material around the edges of the blocks 312, 316, 320, and 324 to form the groups of pixels 308 on the edge of the test pattern.

As discussed above, the actual values for 'n' and 'm' vary and are dependent on printer process parameters, resolutions, nominal drop masses, and the like. Additionally, the minimum values for 'n' and 'm' vary depending on the type and quality of sensor 120. For a given sensor 120, 'n' and 'm' values must be large enough that the sensor 120 can adequately and stably resolve a height of the drops of material ejected by each ejector and thus measure a relative drop mass ejected from each ejector. Additionally, using higher values for 'n' and 'm' generally allows for the use of a cheaper sensor 120 having a lower measurement resolution.

Figure 5:
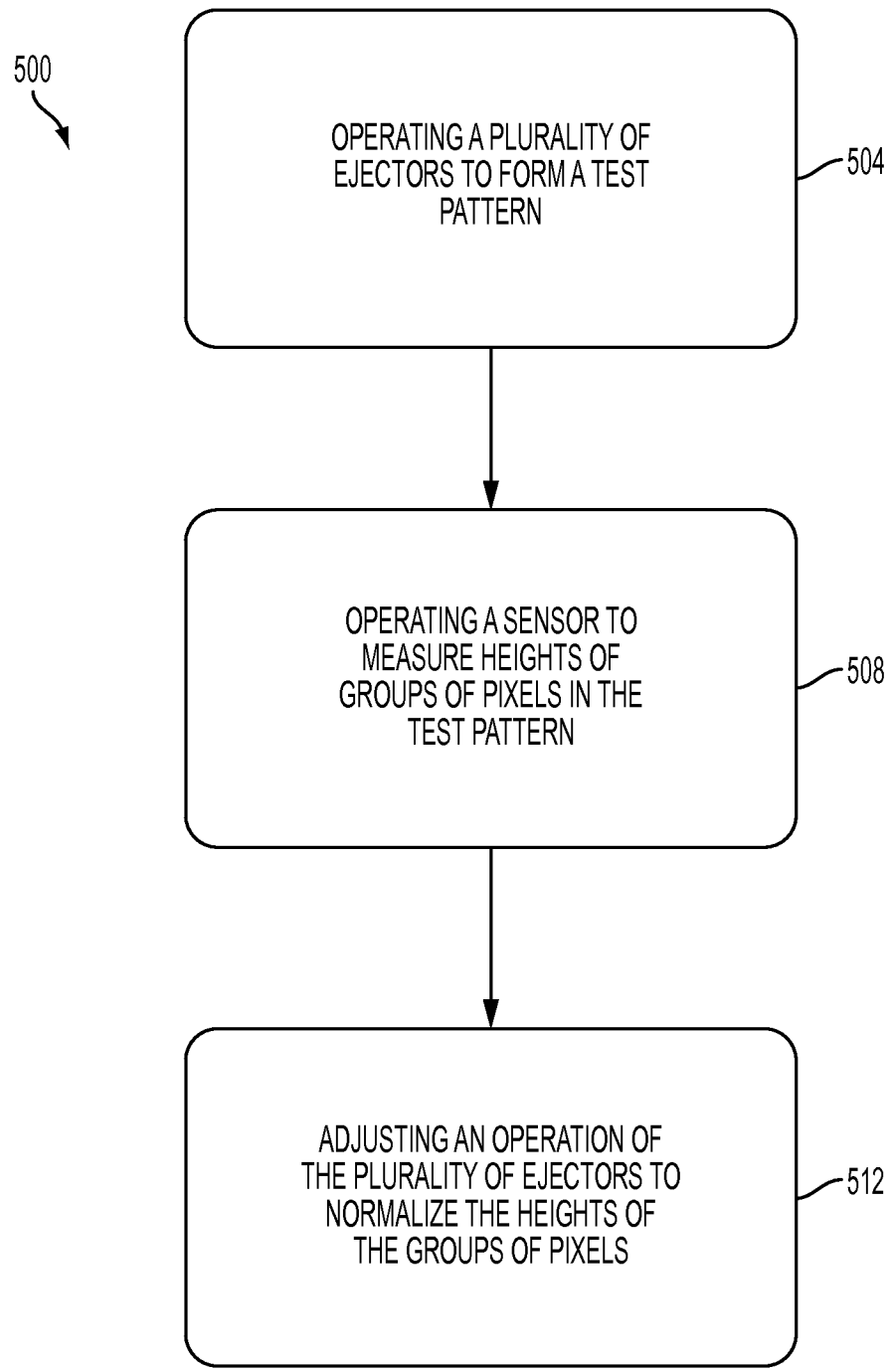
FIG. 5 shows a method for calibrating ejectors in an ejector head.

A method 500 for operating a three-dimensional object printer is shown in FIG. 5. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 124 noted above can be such a controller or processor. Alternatively, the controller can be implemented with more than one processor and associated circuitry and components, each of which is configured to form one or more tasks or functions described herein.

When the method 500 is performed, it begins by operating a plurality of ejectors to form a test pattern (block 504). Particularly, the controller 124 operates a plurality of ejectors of the ejector head 108 to eject drops of material toward the surface 112 of the platen 104 to form a layer of material that includes the test pattern 300, such as the layer 400. However, in other embodiments, the ejector head 108 may form the test pattern on another surface, such as a movable ribbon or other temporary testing surface.

In one embodiment, the test pattern is formed with multiple layers or with multiple drops of material for each pixel. Particularly, the controller 124 is configured to operate the ejectors of the ejector head 108 to form multiple layers of the test pattern or to operate the ejectors of the ejector head 108 to form each pixel of the test pattern with multiple drops of material. In this way, the test pattern formed on the platen is sufficiently thick that the sensor 120 can better measure the heights of the groups of pixels. Particularly, some sensors 120 have a minimum height that the sensor can measure or a range of heights that the sensor can measure most accurately.

Next, the method 500 operates a sensor to measure heights of groups of pixels in the test pattern (block 508). Particularly, the controller 124 operates the sensor 120 to generate and send measurements of heights of the pixels 304 of the groups of pixels 308 to the controller 124. In one embodiment, the controller 124 operates the sensor 120 to measure an average or estimated height for each of the groups of pixels 308. Particularly, depending on the resolution of the sensor 120, the sensor may not be able to resolve the height of individual pixels of the test pattern 300. By measuring a height for each of the groups of pixels 308, rather than heights for each individual pixel, a lower resolution and cheaper sensor 120 can be used.

Next, the method 500 adjusts an operation of the plurality of ejectors to normalize the heights of the groups of pixels (block 512). Particularly, the controller 124 adjusts operation of at least one ejector of the ejector head 108 based on the measured heights of the pixels to normalize the heights of the groups of the pixels 308. In some embodiments, the controller 124 adjusts drop masses of the ejectors of the ejector head 108 with reference to the measured heights of the pixels of the groups of pixels 308. Particularly, in one embodiment, the controller 124 compares heights of the pixels of different groups of pixels 308. If an ejector of the ejector head is determined to be forming groups of pixels 308 having a smaller height than other groups of pixels 308, then the controller 124 adjusts firing signals of that ejector to increase the drop mass ejected by the ejector. Conversely, if an ejector of the ejector head is determined to be forming groups of pixels 308 having a larger height than other groups of pixels 308, then the controller 124 adjusts firing signals of that ejector to decrease the drop mass ejected by the ejector.

Alternatively, in other embodiments, the controller 124 adjusts a dithering or a half-toning of the ejectors of the ejector head 108 with reference to the measurements of the heights of the pixels of the groups of pixels 308. Particularly, in one embodiment, the controller 124 compares heights of the pixels of different groups of pixels 308. If an ejector of the ejector head is determined to be forming groups of pixels 308 having a larger height than other groups of pixels 308, then the controller 124 adjusts the dithering or the half-toning process that is applied to images sent to that ejector to decrease the effective frequency of drops ejected by the ejector. This image dithering or half-toning can be applied to larger regions than simply a single ejector. That is, a measured height averaged over several neighboring ejectors can be used to dither or half-tone the image data.

The goal of the method 500 is to normalize the heights of layers produced by the printer such that the layers are completely level and uniform. In one embodiment, the heights of the groups of pixels 308 are normalized to a predetermined height. Particularly, the controller 124 adjusts operation of ejectors of the ejector head 108 such that the groups of pixels 308 formed by each of the ejectors have a height equal to the predetermined height. In other embodiments, the heights of the groups of pixels 308 are normalized to an average height of the groups of pixels. Particularly, the controller 124 calculates an average height of the groups of pixels 308 based on the measured heights of the groups of pixels. Then, the controller 124 adjusts operation of the ejectors in the ejector head 108 such that the groups of pixels 308 formed by each of the ejectors have a height equal to the calculated average height of the groups of pixels 308. In some embodiments, the method 500 is performed iteratively until the heights of the layers are completely normalized.

Figure 6:
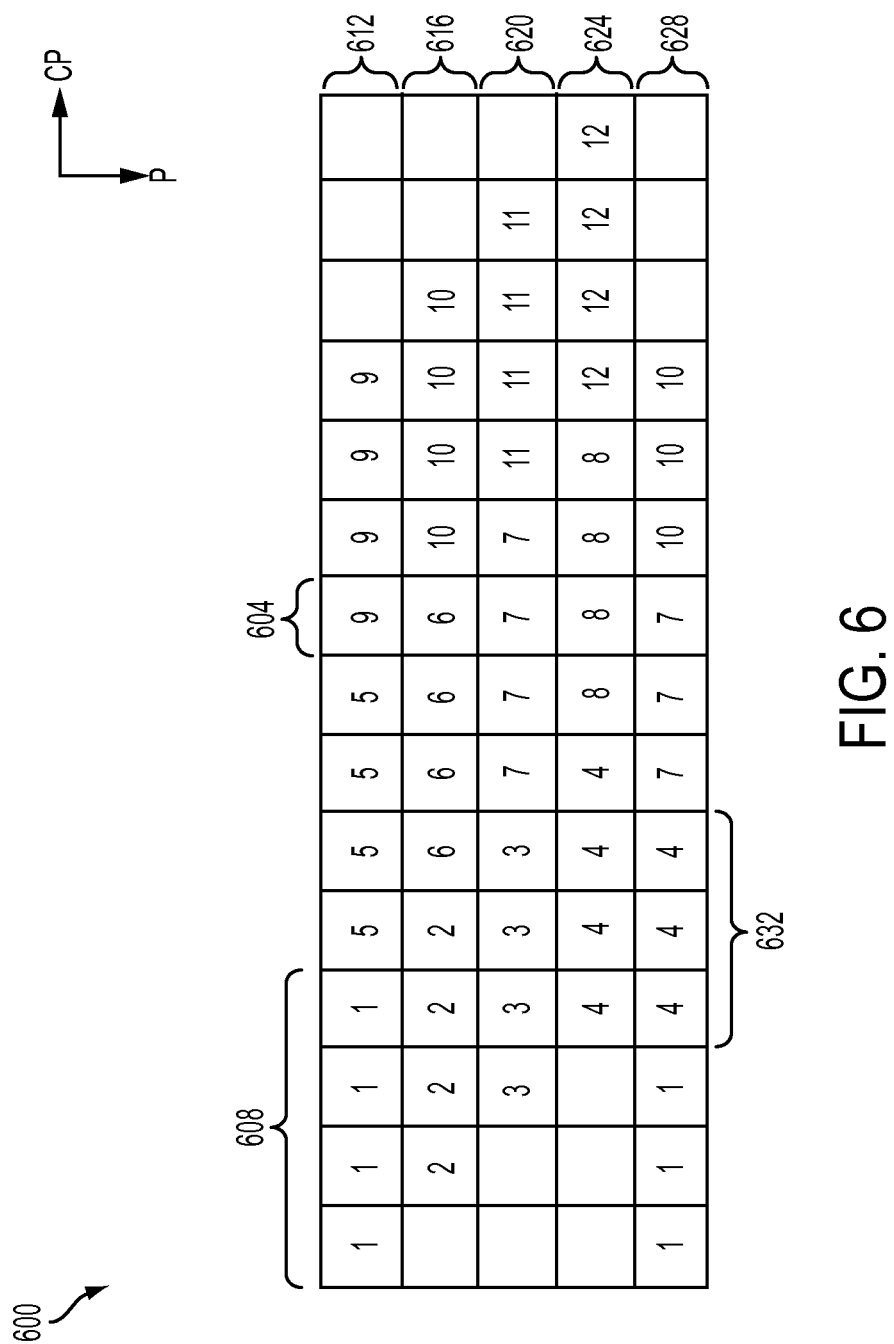
FIG. 6 shows a modified test pattern having a correlation block.

Additionally, some sensors 120 may have high accuracy for measuring relative height in the cross-process direction CP but less accuracy in the process direction P. Alternatively, system configuration circumstances exist in which the distance between rows is large enough that relative height measurements between rows are not adequately accurate. As a result, the controller 124 might be able to determine relative heights or images from ejectors within any given row but not accurately determine the relative heights between sets of rows of ejector images. In one embodiment, the test pattern comprises an additional block for cross-correlation. FIG. 6 shows a test pattern 600 for testing the ejectors 1-12 of the ejector head 108 with cross-correlation. The test pattern includes a plurality of adjacent lines 604 arranged to form groups of pixels 608. The blocks 612, 616, 620, and 624 are similar to the blocks 312, 316, 320, and 324 of the test pattern 300. However, the test pattern 600 comprises an additional correlation block 628. The correlation block 628 comprises a plurality of correlation groups 632, each comprising a plurality of adjacent lines 804. The correlation block 628 has at least one correlation group 632 that corresponds to a pixel group of each of the blocks 612, 616, 620, and 624. Particularly, the subset of ejectors of the ejector head 108 that form the correlation block 628 includes at least one ejector that formed a group of pixels 308 in each of the blocks 612, 616, 620, and 624.

To produce a correlation block that mixes ejectors between blocks, a repeating 'n' pattern is used that is different than the one used in the non-correlation blocks. In one embodiment, the correlation groups 632 have a smaller cross-process width than the groups of pixels 608. As shown, each of the correlation groups 632 have a cross-process width of three pixels; whereas, each group of pixels 608 has a cross-process width of four. This arrangement is advantageous because the ejectors that form the correlation row 628 can be properly staggered for efficiency while also having ejectors in common with each of the other blocks 612, 616, 620, and 624. In other embodiments, the correlation groups 628 have a larger cross-process width than the groups of pixels 608.

If the test pattern 600 having the additional correlation block 628 is used, the controller 124 is further configured to operate the ejectors of the ejector head 108 to form the correlation row 628. Additionally, the controller 124 is configured to operate the sensor 120 to measure heights of the pixels of the correlation groups 632. The controller 124 then cross-correlates the measured heights of the groups of pixels 608 with the measured heights of the correlation groups 632 to identify accurately the ejector of ejector head 108 that corresponds to the measured heights of the groups of pixels 608.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A method of calibrating ejectors in an ejector head of a three-dimensional object printer, the ejector head having a plurality of ejectors configured to eject drops of material towards a surface, the method comprising:

operating the plurality of ejectors to eject drops of material to form a plurality of pixels corresponding to a test pattern on the surface, each ejector in the plurality of ejectors being operated to form a group of directly adjacent pixels in a cross-process direction in the test pattern, each group of adjacent pixels being at least n pixels wide in a cross-process direction for the printer;

operating a sensor to measure heights of pixels for each group of adjacent pixels in the test pattern; and adjusting an operation of the plurality of ejectors by adjusting at least one ejector in the plurality of ejectors to change a mass of each drop subsequently ejected by the at least one ejector, the adjustment to the at least one ejector is made with reference to the measured heights for the group of directly adjacent pixels in which the at least one ejector formed pixels to normalize heights of layers of material formed by the plurality of ejectors.

2. The method of claim 1, the operating of the plurality of ejectors further comprising:

operating different subsets of ejectors in the plurality of ejectors to form different blocks of pixels in the test pattern, each block of pixels including the groups of adjacent pixels formed by the respective different subset of ejectors, each ejector in each subset of ejectors being different than the ejectors in the other subsets used to form other blocks of pixels in the test pattern.

3. The method of claim 2, the operation of the plurality of ejectors further comprising:

operating n subsets of ejectors in the plurality of ejectors to form n blocks of pixels in the test pattern, each block of pixels including the groups of adjacent pixels formed by the respective subset of ejectors, each ejector in each subset of ejectors being different than the ejectors in the other subsets used to form other blocks of pixels in the test pattern.

4. The method of claim 1, the operating of the plurality of ejectors further comprising:

operating a first subset of ejectors in the plurality of ejectors to eject drops of material to form a first block of pixels in the test pattern, the first block of pixels including the groups of adjacent pixels formed by each ejector of the first subset of ejectors; and operating a second subset of ejectors in the plurality of ejectors to eject drops of material to form a second block of pixels in the test pattern, the second block of pixels including the groups of adjacent pixels formed by each ejector of the second subset of ejectors, the second subset of ejectors having no ejectors in common with the first subset of ejectors.

5. The method of claim 4, the operating of the plurality of ejectors further comprising:
operating the second subset of ejectors to form the second block of pixels such that the second block of pixels is non-contiguous with the first block of pixels in a process direction for the printer.

6. The method of claim 4, the operating of the plurality of ejectors further comprising:
operating the second subset of ejectors to form the second block of pixels such that the second block of pixels is contiguous with the first block of pixels in a process direction for the printer.

7. The method of claim 4, the operation of the plurality of ejectors further comprising:
operating the second subset of ejectors to form the second block of pixels such that the second block of pixels is shifted in the cross-process direction with respect to the first block of pixels.

8. The method of claim 4, the operation of the plurality of ejectors further comprising:
operating the first subset of ejectors to form the first block of pixels, the first subset of ejectors being separated in the ejector head by n ejector positions; and
operating the second subset of ejectors to form the second block of pixels, the second subset of ejectors being separated in the ejector head by n ejector positions.

9. The method of claim 1, the adjusting of the at least one ejector in the plurality of ejectors further comprising:
adjusting a half-toning of the at least one ejector in the plurality of ejectors with reference to the measured heights of the pixels for the group of directly adjacent pixels in which the at least one ejector formed pixels.

10. The method of claim 1, the adjusting of the at least one ejector in the plurality of ejectors further comprising:
calculating an average height of the groups adjacent of pixels based on the measured heights for the groups of directly adjacent pixels; and
adjusting the at least one ejector in the plurality of ejectors to enable the at least one ejector in the plurality of ejectors to form pixels having a height equal to the calculated average height.

11. The method of claim 1, the adjusting of the at least one ejector in the plurality of ejectors further comprising:
adjusting the at least one ejector in the plurality of ejectors to enable the at least one ejector in the plurality of ejectors to form pixels having a height equal to a predetermined height.

12. The method of claim 1 further comprising:
repeating the operation of the plurality of ejectors to form the test pattern with multiple layers of drops of material.

13. The method of claim 4 further comprising:
operating a third subset of ejectors in the plurality of ejectors to form a third block of pixels, the third block of pixels including a group of directly adjacent pixels in the cross-process direction formed by each ejector of the third subset of ejectors, the third subset of ejectors having at least one ejector in common with the first subset of ejectors and at least one ejector in common with the second subset of ejectors;
operating the sensor to measure heights of drops of material corresponding to each group of directly adjacent pixels in the third block of pixels;
cross-correlating the measured heights for the groups of directly adjacent pixels in the first block of pixels and the second block of pixels with the measured heights for the groups of directly adjacent pixels in the third block of pixels; and
identifying which of the measured heights for the groups of directly adjacent pixels in the first block of pixels and the second block of pixels correspond to which ejectors in the plurality of ejectors based on a cross-correlation.

14. The method of claim 13, the operation of the third subset of ejectors further comprising:
operating the third subset of ejectors to form the third block, the groups of directly adjacent pixels in the third block being at least one of less than n pixels wide in the cross-process direction and greater than n pixels wide in the cross-process direction.

15. The method of claim 1, the adjusting of the at least one ejector further comprising:
changing a firing signal used to operate the at least one ejector.

16. The method of claim 15 wherein the changing of the firing signal used to operate the at least one ejector increases the mass of the drops subsequently ejected by the at least one ejector.

17. The method of claim 15 wherein the changing of the firing signal used to operate the at least one ejector decreases the mass of the drops subsequently ejected by the at least one ejector.

* * * * *